Sept. 30, 1941.  M. H. ARNOLD  2,257,321
COUPLING
Filed April 14, 1939
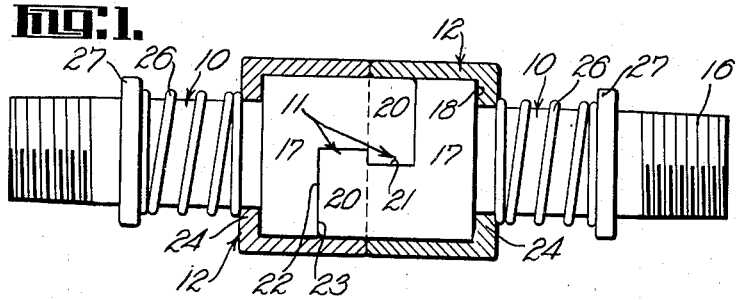
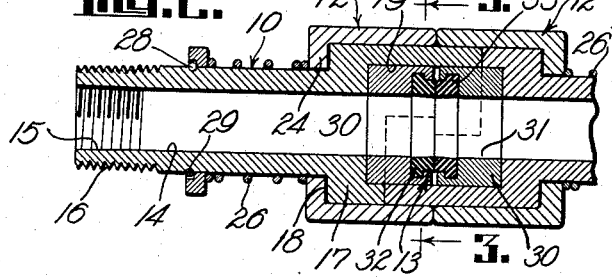 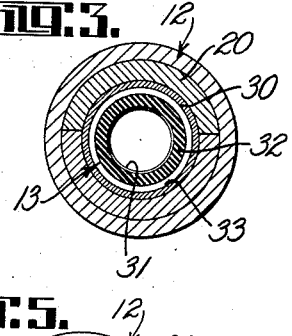
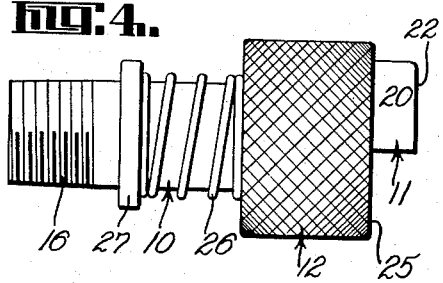 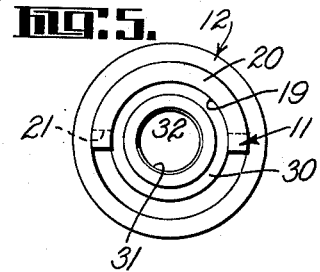
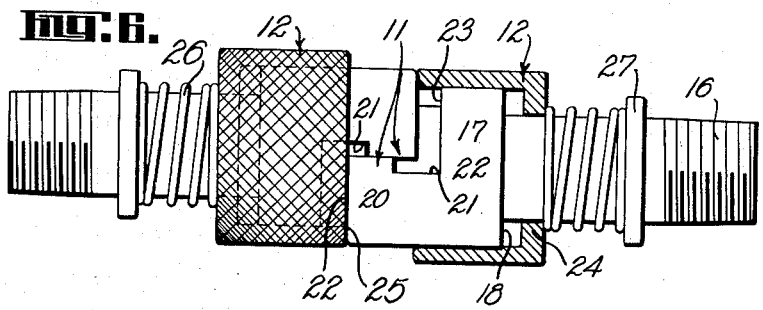
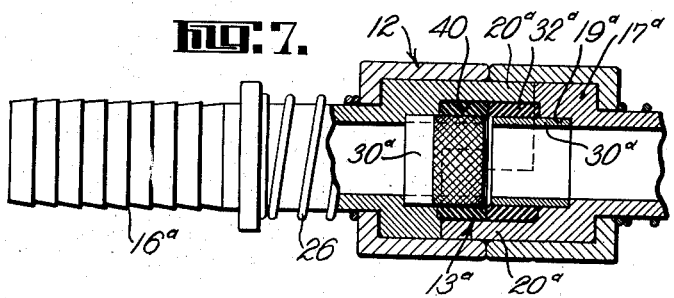
Inventor
Mathew H. Arnold
By
His Attorney Patented Sept. 30, 1941

2,257,321

UNITED STATES PATENT OFFICE 2,257,321

COUPLING

Mathew H. Arnold, Long Beach, Calif.

Application April 14, 1939, Serial No. 267,845

5 Claims. (Cl. 285—175)

This invention relates to a connecting device or coupling device and relates more particularly to a releasable coupling. A general object of this invention is to provide a simple, practical and dependable releasable coupling.

The present invention is capable of embodiment in connecting and coupling devices of various natures, for example, it is suited for embodiment in pipe couplings, rod couplings, hose couplings and in couplings for connecting the parts of pipes or conduits handling various classes of fluids. I will herein make particular reference to and will describe the invention embodied in a releasable coupling for connecting the parts of a fluid handling line or system such as a pipe line, hose line, or the like. It is to be understood that this particular application of the invention is merely typical and illustrative and is not to be taken as limiting the scope or applicability of the invention.

Another object of this invention is to provide a coupling for a conduit, pipe, hose line, or the like, that may be easily and quickly made up or connected and easily and quickly disconnected without the necessity of employing wrenches or other tools.

Another object of this invention is to provide a coupling of the character mentioned that may be connected and disconnected without rotating any parts and therefore without employing threaded parts.

Another object of this invention is to provide a releasable coupling that is made up or connected by merely pushing the two coupling units or assemblies together and that may be freed for disconnection by merely shifting two shiftable sleeves.

Another object of this invention is to provide a releasable coupling that comprises two like or identical assemblies each adapted for application to a pipe, conduit or hose part. The two units or coupling assemblies comprising the coupling of the present invention being identical, greatly simplify and expedite the connecting and handling of the conduit or hose sections as it is unnecessary to arrange the hose sections with mating male and female parts in opposition and the opposite ends of the several sections of the line may have identical coupling assemblies. The two coupling assemblies being identical provide for great economy in the manufacture and marketing of the device.

Another object of this invention is to provide a releasable coupling of the character mentioned that is dependable and strong and not liable to failure, leakage or unintentional disconnection.

A further object of this invention is to provide a coupling of the character mentioned that embodies a simple effective packing means that is made operative when the two coupling assemblies are pushed together for connection.

The various objects and features of my invention will be fully understood from the following detailed description of typical preferred forms and applications of the invention, throughout which description reference is made to the accompanying drawing, in which:

Fig. 1 is a side elevation of one form of coupling of the invention with the sleeves in longitudinal cross section to illustrate the cooperating clutch parts. Fig. 2 is a fragmentary longitudinal detailed sectional view of the coupling illustrated in Fig. 1. Fig. 3 is a transverse detailed sectional view taken as indicated by line 3—3 on Fig. 2. Fig. 4 is a side elevation of one of the coupling units or assemblies of the coupling illustrated in Fig. 1. Fig. 5 is an end view of the unit or assembly illustrated in Fig. 4. Fig. 6 is a side elevation of the coupling illustrated in Fig. 1 showing the manner in which the assemblies are connected and illustrating one of the sleeves in longitudinal cross section, and Fig. 7 is a fragmentary longitudinal detailed sectional view of the improved coupling of the invention embodying another form of packing means and showing one end portion of the coupling in side elevation.

The coupling of the present invention illustrated in Figs. 1–6, inclusive, may be said to comprise, generally, two units or assemblies each including a typical body 10 having jaws or clutch parts 11, a spring-urged sleeve 12 shiftable on the body 10 and packing means 13, the clutch parts 11 of the two assemblies being inter-engageable, the sleeves of the two assemblies being operable to hold the clutch parts 11 in engagement and the two packing means 13 being cooperable to provide a seal between the two assemblies.

The bodies 10 of the coupling assemblies are preferably identical elongate tubular members. The bodies 10 may be varied somewhat in construction depending upon the use or application of the coupling. In the construction illustrated the bodies 10 are integral or one-piece members having central longitudinal openings 14 for passing or handling fluid. The outer end portions of the bodies 10 are preferably provided with means for facilitating the connection of the bodies 10 with other elements or parts of the conduit, hose line, or pipe line in which the coupling is to be used. In the case illustrated the outer end portions of the bodies 10 have both internal threads 15 and external threads 16 that may be used optionally for the connection of the bodies with the hose or pipe line elements. It is to be understood that the outer end portions of the bodies 10 may be formed or conditioned in other manners, for example, they may have wickers 16ª as illustrated in Fig. 7 for facilitating the connection of the bodies with hose sections, or the like. The bodies 10 are preferably, although not necessarily, provided with cylindrical exteriors. In the preferred construction a head 17 of enlarged diameter is provided on the inner end of each body 10. The rear faces of the heads 17 form annular shoulders 18 on the bodies 10. The forward or inner ends of the heads 17 are counterbored, that is, sockets 19 are provided at the inner ends of the openings 14. The sockets 19 are provided to contain the packing means 13 as will be hereinafter described.

The jaws or clutch parts 11 are provided to releasably connect the two bodies 10 against axial separation or disconnection. The clutch parts 11 are provided or formed on the heads 17 and are preferably integral with the heads and the bodies 10. Each head 17 has an extension 20 on its forward or inner end. The extensions 20 may have a circumferential extent of slightly less than 180°. The outer ends of the head extensions 20 are flat and preferably lie in planes transverse of the longitudinal axes of the bodies 10. The jaws or clutch parts 11 project from the axial edges or sides of the extensions 20, there being two substantially diametrically opposite clutch parts 11 on each extension 20. The clutch parts 11 are alike in size and shape. The clutch parts 11 are spaced from the bases of the extensions 20, leaving notches 21 in the opposite axial edges of the extensions. The jaws or clutch parts 11 are proportioned so that the arc between the extremities of the two clutch parts on one body extension 20 is greater than 180°.

The notches 21 occurring in the extension 20 of one body 10 are adapted to receive the clutch parts 11 on the extension 20 of the other body 10 and vice versa. The inner or forward ends of the clutch parts 11 are flush with and form continuations of the inner or forward ends of the extensions 20 while the forwardly facing walls of the notches 21 are flush yith and form continuations of the inner or forward ends 23 of the heads 17. With this relationship of parts the ends 22 of the extensions 20 are adapted to cooperate with the ends 23 of the heads 17 when the clutch parts 11 are engaged, that is, when the clutch parts are received in the notches 21. It will be seen that the bodies 10 are securely connected against relative axial movement in both directions when the clutch parts 11 are in engagement. Further, it is to be observed that the clutch parts 11 can only be disengaged by relative lateral movement.

The sleeves 12 are provided to hold the engaged clutch parts 11 against relative lateral movement and thus maintain the clutch parts in cooperation and prevent disconnection of the bodies 10. The sleeves 12 are spring urged and are manually retractable to permit the easy intentional disengagement of the clutch parts 11. There is one sleeve 12 provided on each body 10. The sleeves 12 surround the heads 17 of the bodies 10 and are shiftable axially or longitudinally on the heads. In-turned annular flanges 24 are provided on the outer ends of the sleeves 12 and surround or ride on the bodies 10 proper. The flanges 24 are engageable with the shoulders 18 to limit the forward or inner movement of the sleeves 12 on the heads 17. The sleeves 12 are of sufficient length to overlie or cover the notches 21 in the extensions 20 of their respective heads 17. Accordingly, the sleeve 12 carried by one body 10 is adapted to cover the clutch parts 11 on the other assembly or body 10 when the same are engaged in the notches 21 of the first mentioned body 10. This engagement of the sleeves 12 over the notches 21 and the clutch parts 11 prevents the lateral disengagement of the clutch parts and therefore prevents the disconnection of the two bodies 10. The forward or inner ends 25 of the sleeves 12 are preferably flat and are adapted to engage or cooperate when the coupling is made up. The peripheries of the sleeves 12 are preferably knurled to facilitate their manual manipulation.

Spring means are provided to urge the sleeves 12 forwardly on the bodies 10 and to yieldingly hold the sleeves in the positions where they cover the notches 21 and hold the clutch parts 11 in cooperation as above described. Suitable helical springs 26 are arranged around the bodies 10 and engage against the outer or rear sides of the sleeve flanges 24. The springs 26 are under compression between the flanges 24 and suitable abutment rings 27 on the bodies 10. The abutment rings 27 may be held against outward or rearward movement by split wire rings 28 partially received in grooves 29 in the bodies 10. It is believed that it will be apparent how the springs 26 operate to normally hold the sleeves 12 in the positions illustrated in Figs. 1 and 2 of the drawing where they overlie the notches 21 to maintain the clutch parts 11 in engagement.

The packing means 13 are provided to prevent the leakage of fluid from between the two units or assemblies when the coupling is made up or connected. The packing means 13 are such that they are brought into effective sealing cooperation when the two assemblies are brought together and connected. The means 13 include nipples or tubular carriers 30 set in the above described sockets 19. The packing carriers 30 may be simple tubular parts rigidly secured in the sockets 19. In practice the carriers 30 may be force-fitted or press-fitted in the sockets 19. The openings 31 in the tubular carriers 30 are preferably of the same diameter as the openings 14 and register with the openings 14.

The packing means 13 further include packing rings 32 set or arranged in the forward end portions of the carriers 30. The rings 32 are formed of a resilient compressible packing material such as rubber, rubber composition, or synthetic rubber. The packing rings 32 have ribs or flanges engaged in internal grooves 33 in the carriers 30 and are retained in the carriers by this engagement. The carriers 30 are proportioned to extend forwardly beyond the ends 23 of the heads 17 and the packing rings 32 protrude beyond the forward ends of the carriers 30 so that the two packing rings are brought into tight engagement when the coupling assemblies are brought together and connected. In practice the parts are related so that the packing rings 32 are compressed to some extent when the coupling is made up. This assures a dependable seal. The resiliency of the compressed packing rings 32 may assist in holding the clutch parts 11 in tight cooperation to prevent the development of play and slackness in the coupling. The packing means 13 just described is particularly effective in preventing the leakage or loss of fluid under pressure, and the coupling provided with the packing means 13 is well suited to handle fluid under pressure.

Fig. 7 of the drawing illustrates a coupling of the invention provided with a packing means 13a adapting the coupling for use in a line, hose or the like, handling air or other fluid under subatmospheric pressure. The packing means 13a include nipples or carriers 30a set in sockets 19a in the forward ends of the body heads 17a. The carriers 30a are rigidly secured in the sockets 19a. Annular members or rings 32a of packing material surround the carriers 30a. The rings 32a are formed of a suitable resilient and compressible packing material such as rubber or synthetic rubber. The interiors of the heads 17a and the extensions 20a may be recessed as at 40 to receive the packing rings 32a. The exteriors of the carriers 30a are roughened or knurled as illustrated to assure the retention of the packing rings 32a. The carriers 30a project beyond the heads 17a and the packing rings 32a protrude from the ends of the carriers to cooperate when the coupling is made up. The inner or forward ends of the packing rings 32a are maintained in tight engagement when the coupling is in service to assure a perfect seal. With the exception of the packing means 13a and the wickers 16a the coupling illustrated in Fig. 7 may be the same as the coupling illustrated in Figs. 1–6, inclusive.

It is believed that the operation of the improved coupling of the invention will be readily understood from the foregoing detailed description. Referring now to Figs. 1–6, inclusive, the coupling may be easily and quickly made up by bringing the outer ends 22 of the extensions 20 against the ends 25 of the sleeves 12 and then pushing the two assemblies together. Fig. 6 of the drawing illustrates the parts in the position just described with the extension ends 22 engaging against the sleeve ends 25 when the two assemblies are pushed together. The engagement of the extensions 20 with the sleeves 12 results in outward movement or retraction of the sleeves 12 and compression of the springs 26. The two assemblies are pushed together until the clutch parts 11 enter the notches 21. In practice the coupling is easily and quickly made up by merely pushing the two assemblies together in the manner described above, the clutch parts 11 automatically snapping into the notches 21 when they reach the notches. When the clutch parts 11 enter the notches 21 relative lateral movement occurs between the bodies 10 and the sleeves 12 are freed from the ends 22 of the extensions 20. When this occurs the springs 26 return the sleeves 12 to their normal positions best illustrated in Figs. 1 and 2 of the drawing. Thus the sleeves 12 are moved to positions where they cover the notches 21 to retain the clutch parts 11 in cooperation.

The sleeves 12 serve to prevent relative lateral movement between the engaged clutch parts 11 and thus serve to prevent disconnection of the coupling. When the coupling is made up as just described the packing rings 32 are brought into engagement and are compressed through this engagement. The cooperating packing rings 32 provide a dependable seal between the two coupling assemblies and serve to prevent the leakage of fluid. The coupling will remain made up or connected until deliberately or intentionally disconnected. The springs 26 hold the sleeves 12 in their normal positions and there is no tendency for the sleeves to retract and permit the disconnection of the clutch parts 11.

When it is desired to break or disconnect the coupling the sleeves 12 are simultaneously retracted or moved away from one another. The operator may engage the knurled peripheries of the sleeves 12 and easily move the sleeves outwardly or rearwardly against the springs 26. When the sleeves 12 have been retracted to positions clear of the notches 21 the coupling assemblies are moved apart laterally to disconnect or disengage the clutch parts 11. This fully frees the two coupling assemblies. The sleeves 12 may then be released to be returned to their normal positions by the springs 26 and the coupling assemblies are conditioned for reconnection.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A coupling comprising two like assemblies each including a body having a projection on its forward end provided with a recess in a longitudinal edge leaving a laterally extending finger to engage in the recess of the other assembly, and a spring pressed sleeve slidable on the body to a position partially overlying the projections of both assemblies when the assemblies are together holding the fingers in the recesses, the portions of the sleeves overlying the projections having a bore substantially the same in diameter as the assembled projections.

2. A coupling comprising two like assemblies each including a body having a projection on its forward end provided with a recess in a longitudinal edge leaving a laterally extending finger to engage in the recess of the other assembly, and a spring pressed sleeve slidable on the body to a position partially overlying the projections of both assemblies when the assemblies are together holding the fingers in the recesses, the projections extending beyond the ends of the sleeves and the fingers being of such lateral extent that when the edges of the fingers are engaged during the assembling of the coupling the projections abut the ends of the sleeves so that pressing together of the assemblies causes the sleeves to be moved against the spring pressure until the fingers reach and enter the recesses.

3. A coupling comprising two like assemblies each including a body having a projection on its forward end provided with a recess in a longitudinal edge leaving a laterally extending finger to engage in the recess of the other assembly, and a spring pressed sleeve slidable on the body to a position partially overlying the projections of both assemblies when the assemblies are together holding the fingers in the recesses, the portions of the sleeves overlying the projections having a bore substantially the same in diameter as the assembled projections, the projections extending beyond the ends of the sleeves and the fingers being of such lateral extent that when the edges of the fingers are engaged during assembling of the coupling the projections abut the ends of the sleeves so that pressing together of the assemblies causes the sleeves to be moved against the spring pressure until the fingers reach and enter the recesses.

4. A coupling comprising two like assemblies each including a body having a projection on its forward end provided with a recess in a longitudinal edge leaving a laterally extending finger to engage the recess of the other assembly, a tubular extension on the forward end of the body spaced from the projection, an annular packing member carried on the extension and arranged in the space between the extension and the projection and projecting forwardly from the extension, and a spring pressed sleeve slidable on the body to a position partially overlying the projections of both assemblies when the assemblies are together holding the fingers in the recesses, the portions of the sleeves overlying the projections having a bore substantially the same in diameter as the assembled projections, the packing members of the two assemblies being pressed together end to end and expanded laterally to seal the joints between the projections when the assemblies are together.

5. A coupling comprising two like assemblies each including a body having a projection on its forward end provided with a recess in a longitudinal edge leaving a laterally extending finger to engage the recess of the other assembly, and a spring pressed sleeve slidable on the body to a position partially overlying the projections of both assemblies when the assemblies are together holding the fingers in the recesses, the projections when engaged with the fingers in the recesses constituting a structure continuous with and of the same diameter as the bodies and the sleeves having bores slidably fitting the bodies and projections and being free to rotate thereon.

MATHEW H. ARNOLD.